Figure 1:
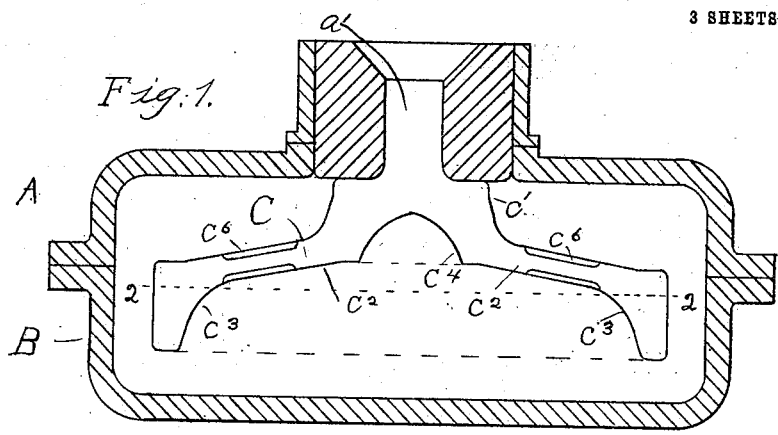

H. R. KEITHLEY.
PROCESS OF MANUFACTURING CAR WHEELS.
APPLICATION FILED APR. 26, 1909. RENEWED FEB. 21, 1913.

1,073,350.                                                Patented Sept. 16, 1913.
3 SHEETS—SHEET 1.

Witnesses
Harry H. Rose
J S Cooper

Inventor
Herbert R. Keithley.

H. R. KEITHLEY.
PROCESS OF MANUFACTURING CAR WHEELS.
APPLICATION FILED APR. 26, 1909. RENEWED FEB. 21, 1913.

1,073,350.

Patented Sept. 16, 1913.

3 SHEETS—SHEET 2.

Witnesses
Henry H. Rose
J S Cooper

Inventor
Herbert R. Keithley.

H. R. KEITHLEY.
PROCESS OF MANUFACTURING CAR WHEELS.
APPLICATION FILED APR. 26, 1909. RENEWED FEB. 21, 1913.
1,073,350.                                    Patented Sept. 16, 1913.
                                                    3 SHEETS—SHEET 3.
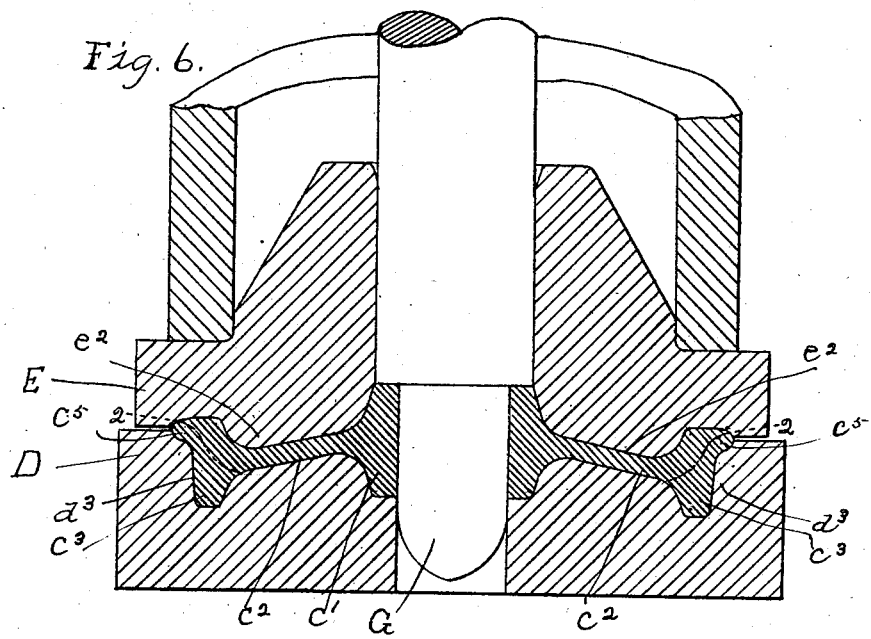
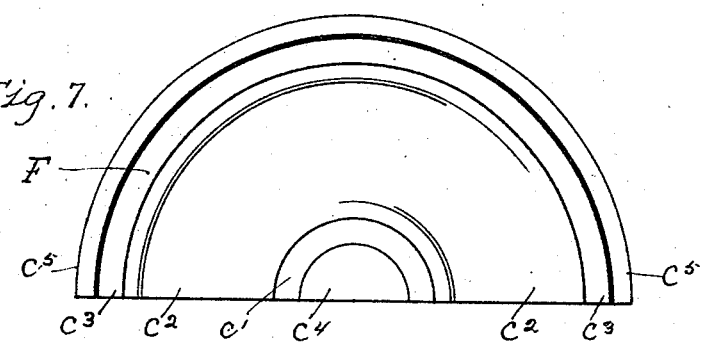
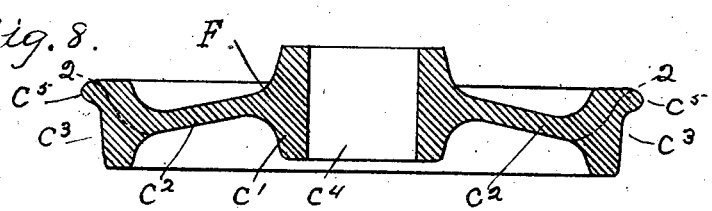
Witnesses  Henry H. Rose                     Inventor
           J. S. Cooper                      Herbert R. Keithley.

UNITED STATES PATENT OFFICE.

HERBERT R. KEITHLEY, OF KANSAS CITY, MISSOURI.

PROCESS OF MANUFACTURING CAR-WHEELS.

1,073,350.  Specification of Letters Patent.  Patented Sept. 16, 1913.

Application filed April 26, 1909, Serial No. 492,323. Renewed February 21, 1913. Serial No. 750,039.

*To all whom it may concern:*

Be it known that I, HERBERT R. KEITHLEY, a citizen of the United States, residing at Kansas City, in the county of Jackson and State of Missouri, have invented certain new and useful Improvements in Processes of Manufacturing Car-Wheels, of which the following is a full, clear, and exact description.

The object of this invention is to produce a car wheel in which the body portion, comprising the hub and web and a portion of the inner part of the rim, shall be made of low carbon soft steel, having the properties of strength and toughness and great resistance to stresses from shock, and in which the wearing body of the rim and flange shall be made of high carbon hard steel, or a hard steel alloy, preferably of manganese steel having above six per cent. content of manganese, and which shall differ greatly in carbon content, or in metallic composition, from that of the low carbon soft steel forming the body portion, and possess properties of intense hardness and great resistance to abrasion and wear.

A further object of my invention is to provide new and improved processes of manufacturing said car wheel, by which the low carbon soft steel body portion can be perfectly united to the hard steel wearing body of the rim and flange, so as to form one integral body of metal.

To this end my invention consists of a new and improved car wheel, and in processes of manufacturing said car wheel by casting molten steel of high carbon content or hard composition, in a mold especially constructed to receive the hard steel in the rim portion of its cavity, the mold being preferably constructed so that the hard steel may be poured in first, and when the rim cavity is filled to a sufficient depth with hard steel and its outer portions begin to solidify and its upper part is still to some extent fluid, the mold cavity is completely filled with the low carbon soft steel which flows over the still fluid portion of the hard steel with which it perfectly unites, and forms a solid integral casting consisting of a hard steel rim of metal compounded with a soft steel central body portion.

In further carrying out my invention the steel casting, or cast blank of compounded hard steel and soft steel, when hot, is subjected to the action of dies in a hydraulic press and forged into a car wheel. The shape of the blank in cross-section being so constructed that when it is subjected to die pressure the metal of the hard steel rim portion will flow to the outer periphery of the wheel so as to form the wearing body of the rim and flange and the soft steel portion of the rim of the cast blank will form the inner portion of the wheel rim. The web portion is also preferably forged by compression under heavy die pressure, and the hub portion, which is cast solid in the blank, is die forged into finished shape with the axle hole completely formed through the hub by die pressure.

Figure 2:
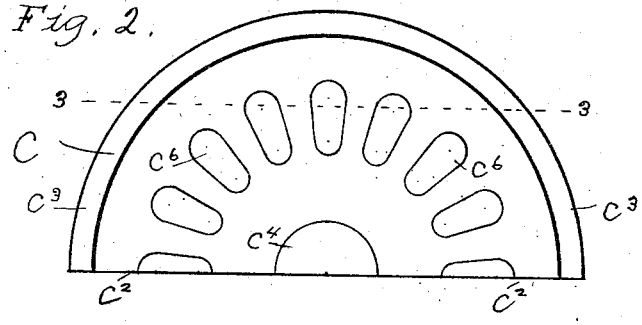
Figure 3:
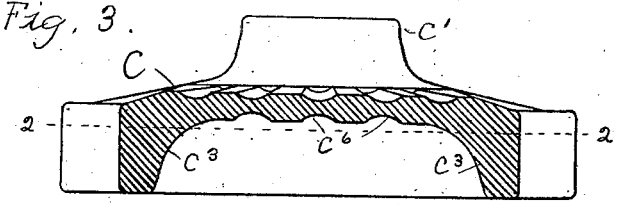
Figure 4:
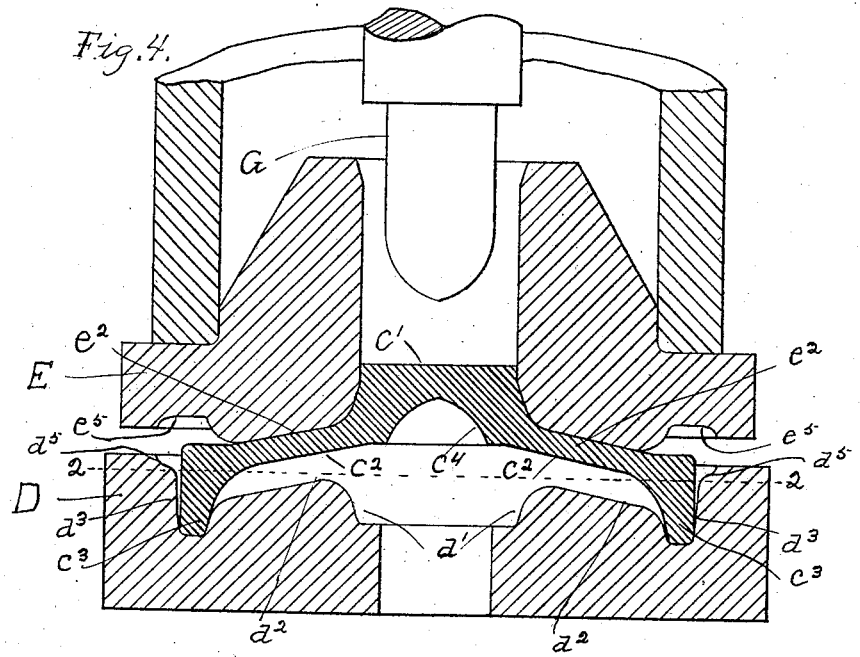
Figure 5:
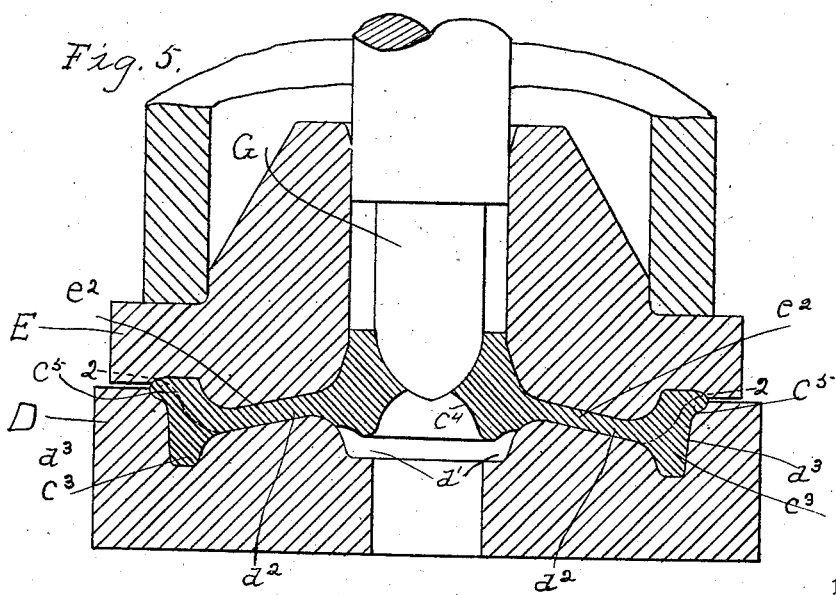

In the accompanying drawings illustrating my invention, in the several figures of which like parts are similarly designated, Figure 1 represents a cross-sectional diagram showing a mold specially constructed so that it will form a cast blank having a hard steel rim portion compounded with a soft steel body portion according to my invention. Fig. 2 is a plan view showing one half of the cast wheel blank formed by the mold, Fig. 1. Fig. 3 is a cross-sectional view of the cast wheel blank, Fig. 2, taken on the line 3. 3. Fig. 4 is a cross-sectional view of the cast wheel blank, Fig. 2, placed in position between forging dies, for reducing the blank to the shape of a car wheel, the dies being shown in vertical cross-section and in the position before being closed down on the blank. Fig. 5 is a vertical section of the dies, Fig. 4, and shows the dies closed down on the blank and the wheel rim, the flange and web portions of the wheel practically forged into finished shape and the hub portion partly forged. Fig. 6 is a vertical section of the dies, Fig. 4, showing a cross-section of a completed car wheel with the hub, web, tread and flange completely formed. Fig. 7 is a plan view and Fig. 8 is a cross section showing one half of a completed car wheel constructed according to my invention.

The cast blank C, Figs. 2 and 3, is formed in a specially constructed mold as shown in Fig. 1, in which A represents a cope and B a drag. $a^1$ represents the riser for giving the required hydrostatic pressure in the fluid metal, and is filled with the melted steel to a sufficient height to collect the impurities and particles of slag, and gas bubbles, which segregate toward the center of a steel casting and rise to the top of the fluid steel as the metal solidifies in the mold. When the casting is removed from the mold the metal column formed in the riser $a^1$ may be discarded by cropping it off as shown in Fig. 3, thereby producing a solid and sound cast blank from which the car wheel is forged.

The web portion of the cast blank is preferably formed with thick portions alternating with thin portions $c^6$ $c^6$ radiating from the hub portion toward the rim of the cast blank, Figs. 1, 2 and 3, in order that the thickened portions may be heated more uniformly and retain the heat more uniformly with the thicker hub and web portions of the cast blank, so that all portions of the blank can be forged at a more uniform temperature.

The mold cavity is especially constructed so that the hub portion $c^1$ is formed wholly on one side of the web portion $c^2$ $c^2$ so that all the hard steel will flow into the rim cavity $c^3$ $c^3$ of the mold, Fig. 1, and leave the entire web and hub portions of the cavity to be filled with the soft steel. A concave cavity, $c^4$, is formed under the center of the hub portion $c^1$ of the cast blank C, Figs. 1, 2 and 4, which enables the hub of the car wheel to be practically finished complete with the axle hole formed entirely through the hub solely by forging, as shown by Figs. 5 and 6.

In the processes of producing a car wheel according to my invention, the hard steel is first poured into the mold, Fig. 1, and fills the rim cavity $c^3$ $c^3$ to a sufficient depth as indicated by the dotted line 2. 2. The soft steel is then poured into the mold before the hard steel is entirely solidified and while its top portion at the line 2. 2. is still to some extent fluid, the soft steel flows over the hard steel, to which it perfectly unites, forming an integral compound cast blank, consisting of a hard steel rim portion $c^3$ $c^3$ and soft steel web and hub portions, $c^1$ and $c^2$ $c^2$, Figs. 2, 3 and 4. The cast blank thus produced is preferably removed from the mold and forged into a car wheel while still retaining its initial heat from casting, or the cast blank may be allowed to cool partly or wholly if desired, and then be re-heated and forged into a car wheel.

When the cast blank C is forged between the dies D. E. as shown in Figs. 4 and 5, the hard steel of the rim portion $c^3$ $c^3$ is caused to flow under pressure of the dies to the outer periphery of the wheel so as to form the wearing body portion of the rim $c^3$ $c^3$ and flange $c^5$ $c^5$ and the soft steel directly united to the hard steel in the rim, is caused to flow under pressure of the dies so as to form the inner portion of the wheel rim as shown by the curved dotted lines 2. 2. Figs. 5, 6 and 8, and thereby forms a backing of soft tough steel integrally united to the hard steel rim and flange for the greater portion of the width of the rim which strengthens and reinforces the rim and flange to withstand the stresses from sudden shock.

The pressure of the die portions $e^2$ $e^2$ and $d^2$ $d^2$ of the dies E. and D., Figs. 4, 5 and 6, upon the thickened radial portions of the web causes the metal to flow into the thinner radial portions $c^6$ $c^6$ of the cast blank C, Figs. 2 and 3, whereby all the metal of the web portion of the blank is thoroughly forged and worked.

The hub forging dies $d^1$ $d^1$ and the forging punch G., Figs. 4 and 5, coöperate to press the metal from the interior of the hub portion $c^1$ of the blank C to the opposite side of the web, thereby forging the hub into its finished shape and forming the axle hole complete by die forging, as shown in Figs. 5, 6, 7 and 8. In forging the hub and axle hole therein, the concave cavity $c^4$ formed in the cast blank C enables the point of the forging punch G to penetrate through the hub portion of the blank and press the metal displaced from the interior of the hub, outward, radially from the punch into the hub dies $d^1$ formed in the matrix D and permits the forging punch G to enter the opening in the matrix D at $d^1$ and exclude the metal from it, as the final pressure of the enlarged shank of the forging punch G is applied on the top face of the hub portion $c^1$, Fig. 6; this final pressure of the enlarged shank of the forging punch entirely fills the hub dies $d^1$ completely finishing the ends and outer faces of the hub and the inner faces of the axle hole $c^4$, Figs. 6 and 8.

The use of manganese steel containing above six per cent. of manganese is made entirely available and practical for forming the wearing body of the rim and flange of a car wheel embodying my invention, and is preferred for this purpose on account of its qualities of intense hardness and toughness and great resistance to abrasion and wear, also to its further remarkable properties which render it almost impossible to anneal or soften this metal. By heat-treatment it can be made tough and ductile, while still retaining its intense hardness, by sudden cooling from a high temperature, by quenching. Whereas, other hard steels are rendered brittle by the same treatment. However, it is obvious that other high carbon steel or steel alloys may be used for this purpose without departing from the scope of my invention, as set forth in the claims.

In all steel wheels at present produced by forging the wheel into shape, the carbon content and composition of metal is uniform throughout, from the hub to the rim, and on account of its softness and rapid wear in service the wheel rim is made very heavy to allow for wear and for restoring the proper contour to the tread and flange by turning the wheel in a lathe. This involves greater first cost for extra metal in the wheel rim and further expense in repairs and maintenance for wrought steel wheels of this type. Whereas, in a car wheel produced according to my invention the wearing body of the wheel rim can be made much lighter, and the composition of metal can be made such that maximum service can be obtained with greatly reduced wear.

In a car wheel produced according to my invention the metal may be subjected to heat-treatment, if required, after the wheel is forged into shape, or the cast blank may be heat-treated before it is forged, or both the cast blank and the forged wheel may be heat-treated if desired.

The carbon content of the relatively low carbon soft steel forming the web and hub portions of the cast blank, of the wheel, can be so proportioned that heat-treatment with air cooling, water or other quenching found adapted to both the hard steel rim and the soft steel body portion can be used, this being one of the important advantages of my invention.

I claim as my invention and desire to secure by Letters Patent:

1. The method of producing a compound steel car wheel blank which consists in successively casting molten hard steel and molten soft steel so as to produce a member in the form of an inverted cup having sides of hard steel and a soft steel bottom overlapping the lower edges of the sides.

2. The method of producing a compound steel car wheel blank, which consists in casting a ring of molten hard steel and before the ring cools casting on top thereof and in contact therewith a layer of molten soft steel to form the center of the blank and to increase the width of the ring in the axial direction by superposing soft steel upon the hard steel.

3. The method of producing a compound steel car wheel blank which consists in casting a partial rim of molten hard steel and then while the hard steel is still partially fluid casting upon and in contact with the same a layer of molten soft steel having a vertical column rising from the center thereof, thereby forming a blank having a soft steel center and a rim composed of hard steel and soft steel joined along a plane transverse to the axis of the blank.

4. The method of producing a compound steel car wheel blank which consists in casting a ring of molten hard steel and then while the hard steel is still partially fluid casting above and in contact with the same a layer of molten soft steel having a column rising therefrom at the center of the ring, so as to form a compound ring of hard and soft steel joined along a plane transverse to the axis of the ring and a central portion of soft steel.

5. The method of producing a compound steel car wheel blank which consists in casting a ring of molten hard steel and then while the hard steel is still partially fluid casting above and in contact with the same a layer of molten soft steel with a column rising therefrom at the center of the ring and with thickened portions extending from said ring to said column at various angularly-separated points.

6. The method of producing a compound steel car wheel blank which consists in casting molten hard steel into a mold in the shape of a shallow inverted cup so as not to overflow the portion of the mold forming the sides of the cup and then casting molten soft steel upon the same so as to fill the mold and forming a layer of soft steel on the upper edge of the hard steel member.

7. The method of producing a compound steel car wheel blank which consists in successively casting molten hard steel and molten soft steel so as to form a member in the form of an inverted cup having sides of hard steel and a soft steel bottom overlapping the lower edges of the sides together with a vertical column rising from the bottom at the center thereof.

8. The method of producing a compound steel car wheel blank which consists in casting a ring of molten hard steel and while the ring is still partially fluid casting a layer of molten soft steel to form the center and causing a portion of the soft steel to flow across the top and in contact with said ring so as to increase the width of the ring by a mass of soft steel on top thereof.

9. The method of producing a compound steel car wheel blank which consists in casting a disk of soft steel with a column rising from the center thereof and with a depending flange of hard steel at the periphery thereof, and then discarding the column.

In testimony whereof I have hereunto set my hand this 24th day of April 1909.

HERBERT R. KEITHLEY.

Witnesses:
J. S. COOPER,
J. M. BOHANNON.